(12) United States Patent
Nagatsuka et al.

(10) Patent No.: US 8,155,789 B2
(45) Date of Patent: Apr. 10, 2012

(54) DEVICE, METHOD, PROGRAM AND RECORDING MEDIUM FOR ROBOT OFFLINE PROGRAMMING

(75) Inventors: Yoshiharu Nagatsuka, Yamanashi (JP); Kozo Inoue, Yamanashi (JP)

(73) Assignee: Panuc Ltd, Yamanashi (JP)

( * ) Notice: Subject to any disclaimer, the term of this patent is extended or adjusted under 35 U.S.C. 154(b) by 1061 days.

(21) Appl. No.: 11/960,995

(22) Filed: Dec. 20, 2007

(65) Prior Publication Data

US 2008/0154428 A1    Jun. 26, 2008

(30) Foreign Application Priority Data

Dec. 20, 2006    (JP) .................................. 2006-342985

(51) Int. Cl.
*G05B 19/04* (2006.01)

(52) U.S. Cl. .............. 700/250; 700/86; 700/87; 700/88; 700/159; 700/178; 318/567; 318/568.1; 318/568.11; 318/568.12; 318/568.13; 901/2; 901/3; 901/4; 901/5; 901/6; 219/124.34; 414/730

(58) Field of Classification Search ............... 700/86, 700/87, 88, 159, 178, 182, 186, 193, 245, 700/247, 248, 249, 250, 251, 252, 253, 254, 700/259, 262, 264; 318/567, 568.1, 568.11, 318/568.12, 568.13, 568.15, 568.16, 568.18, 318/568.19, 568.23, 568.24, 574, 632; 901/2, 901/3, 5, 6, 7, 8, 9, 10, 15, 23, 25, 41, 42; 219/124.34; 414/730

See application file for complete search history.

(56) References Cited

U.S. PATENT DOCUMENTS 3,920,972 A * 11/1975 Corwin et al. ................ 700/251

(Continued)

FOREIGN PATENT DOCUMENTS

DE    101 24 044 A1    11/2002

(Continued)

OTHER PUBLICATIONS

Yoshida et al., "Modeling and Computer Simulation of 3D Object Grasping and Manipulation by Dual Fingers Under Nonholonomic Constraints", Proceedings of the 2006 IEEE/RSJ, International Conference on Intelligent Robots and Systems, Oct. 9-15, 2006, Beijing, China.

(Continued)

*Primary Examiner* — James Trammell
*Assistant Examiner* — McDieunel Marc
(74) *Attorney, Agent, or Firm* — Lowe Hauptman Ham & Berner LLP

(57) ABSTRACT

An offline programming device for preparing an operation program for making a robot with a hand perform a handling operation for an object with respect to a machine tool. The device includes a hand-position designating section designating a relative positional relationship between the object and the hand when the hand holds the object; a first calculating section determining a position and orientation of the object mounted on the machine tool when the robot performs the handling operation, based on a command specifying a position of the object and included in a workpiece processing program given to the machine tool; a second calculating section determining a position and orientation of the robot acting to hold the object by the hand when the robot performs the handling operation, based on the relative positional relationship between the object and the hand and the position and orientation of the object; and an operation-program generating section generating the operation program by using the position and orientation of the robot.

12 Claims, 7 Drawing Sheets

U.S. PATENT DOCUMENTS

| | | | | |
|---|---|---|---|---|
| 4,833,624 | A * | 5/1989 | Kuwahara et al. | 700/249 |
| 5,937,143 | A * | 8/1999 | Watanabe et al. | 700/264 |
| 6,489,741 | B1 * | 12/2002 | Genov et al. | 318/561 |
| 6,928,337 | B2 * | 8/2005 | Watanabe et al. | 700/245 |
| 7,321,808 | B2 * | 1/2008 | Nagamatsu | 700/248 |
| 7,346,478 | B2 * | 3/2008 | Walacavage et al. | 703/7 |
| 7,391,178 | B2 * | 6/2008 | Tanaka et al. | 318/568.2 |
| 7,480,600 | B2 * | 1/2009 | Massie et al. | 703/6 |
| 7,702,491 | B2 * | 4/2010 | Walacavage et al. | 703/6 |

FOREIGN PATENT DOCUMENTS

| | | |
|---|---|---|
| EP | 0 807 497 A1 | 11/1997 |
| EP | 1 107 081 A2 | 6/2001 |
| EP | 153010 A2 | 5/2005 |
| JP | 3184742 A | 8/1991 |
| JP | 05-324034 A | 12/1993 |
| JP | 2654206 B2 | 5/1997 |
| JP | 2001142520 A | 5/2001 |
| JP | 2005-138223 A | 6/2005 |
| WO | 00/73028 A1 | 12/2000 |
| WO | 01/17729 A1 | 3/2001 |

OTHER PUBLICATIONS

Partial European Search Report dated Jan. 8, 2009 for Corresponding European Application No. 07 02 4622.

Notice of Reasons for Rejection for JP 2006-342985 dated Sep. 16, 2008.

EP Search Report for 11005946.6 dated Sep. 5, 2011.

* cited by examiner

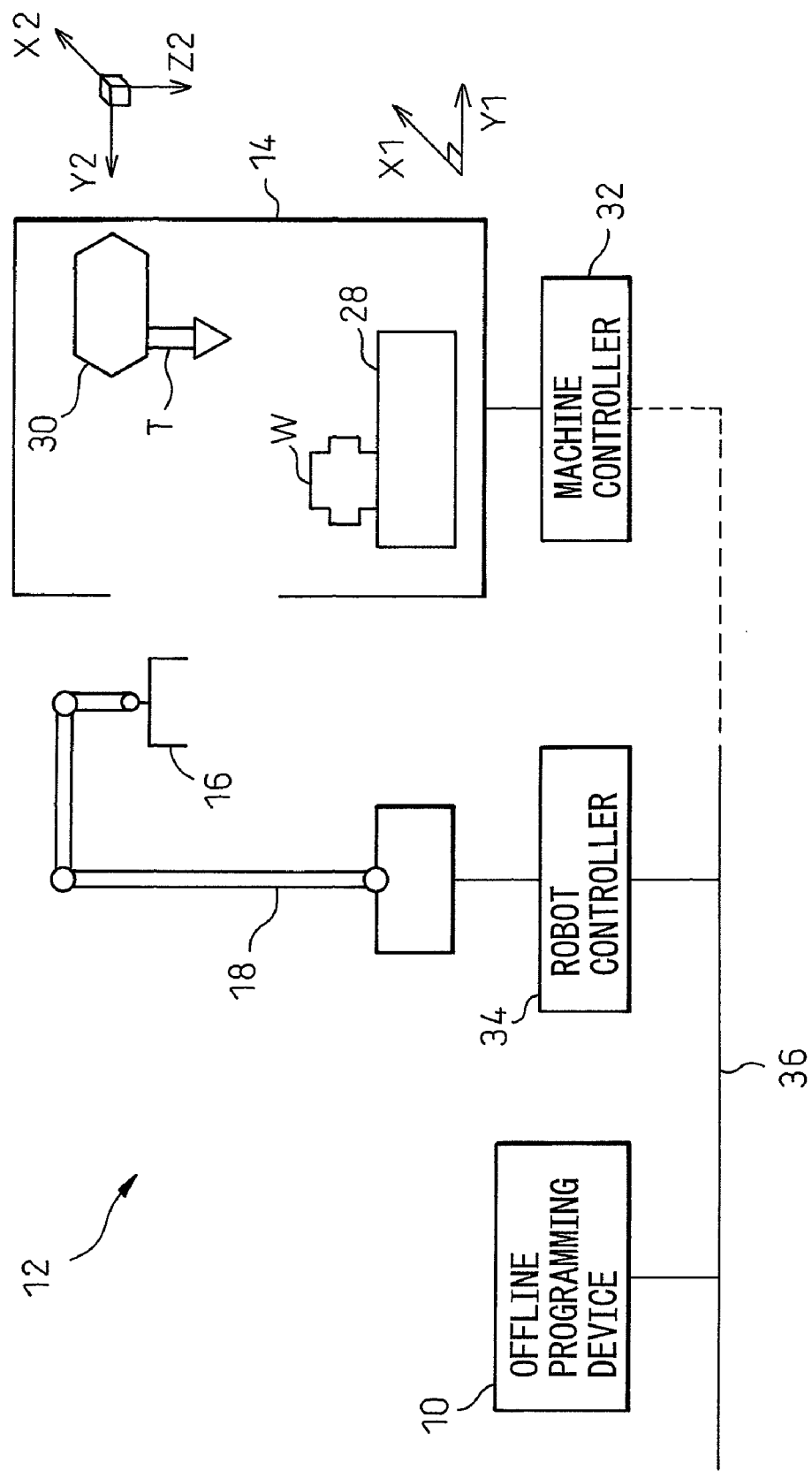

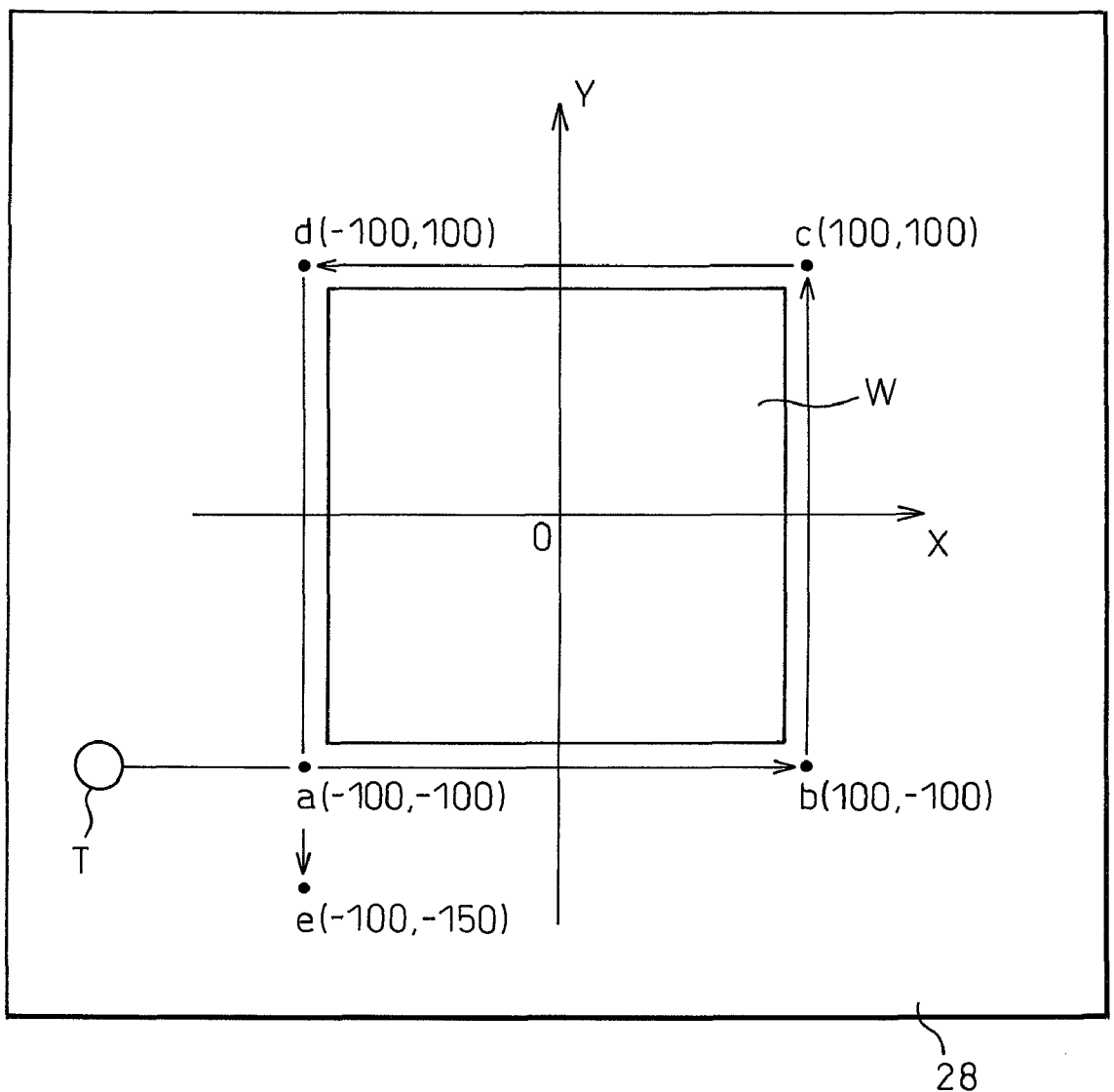

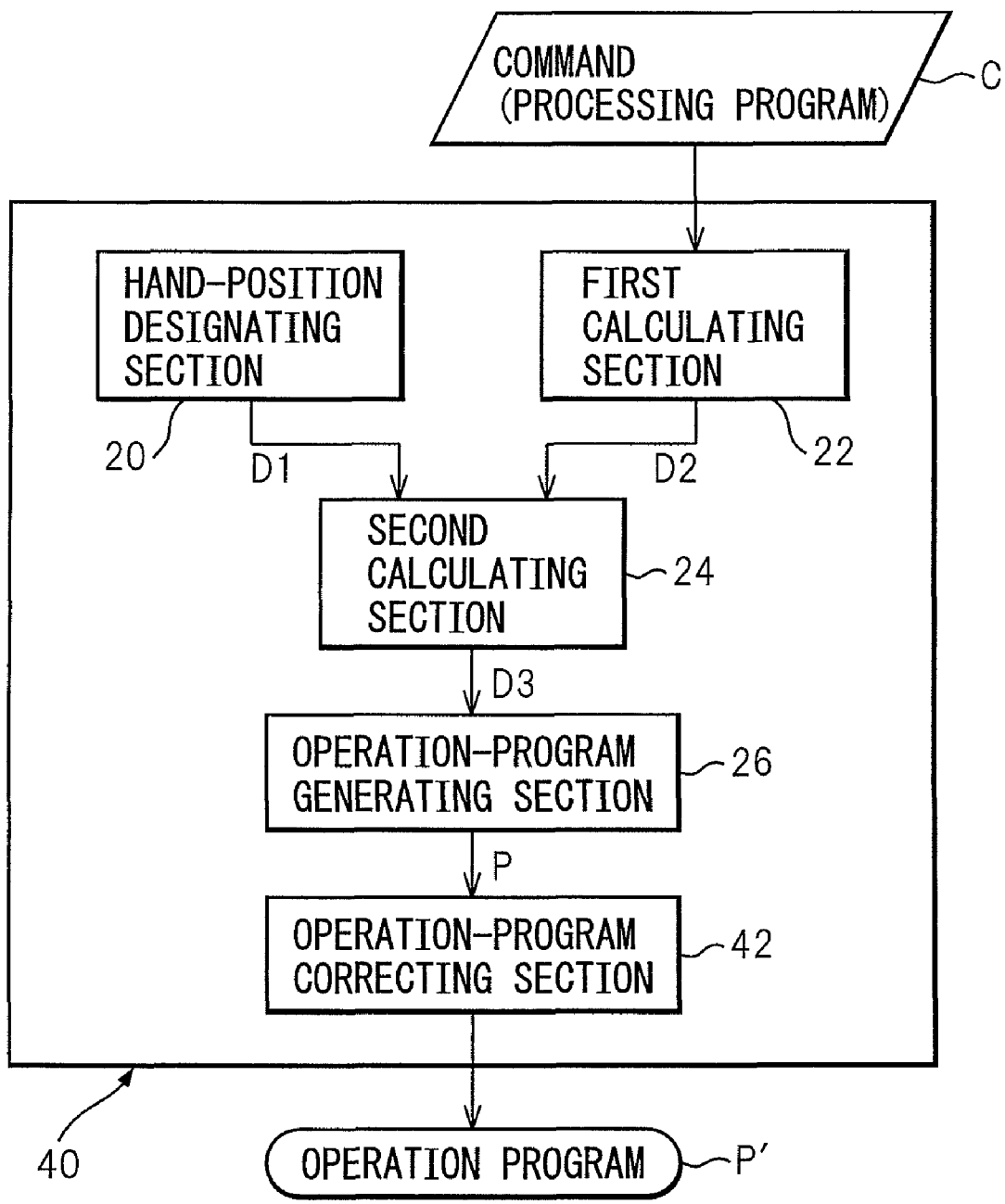

DEVICE, METHOD, PROGRAM AND RECORDING MEDIUM FOR ROBOT OFFLINE PROGRAMMING

RELATED APPLICATIONS

The present application is based on, and claims priority from, Japanese Application Number 2006-342985, filed Dec. 20, 2006, the disclosure of which is hereby incorporated by reference herein in its entirety.

BACKGROUND OF THE INVENTION

1. Field of the Invention

The present invention relates to a robot programming technique, and more particularly to an offline programming device and an offline programming method, for preparing, in an offline mode, an operation program for making a robot perform a handling operation for a workpiece or a tool with respect to a machine tool. The present invention also relates to a program and a recording medium, for preparing, in an offline mode, an operation program for making a robot perform a handling operation for a workpiece or a tool with respect to a machine tool.

2. Description of the Related Art

In a manufacturing system using a robot (in particular, an industrial robot), a configuration in which a robot is instructed to perform an operation or task for handling a process-related object, such as a workpiece, a tool, etc., relative to a machine tool; for example, loading the object onto a predetermined mount section such as a table, a tool rest, etc.; unloading the object from the mount section; or changing a position or orientation of the object on the mount section is known. In this system configuration, the handling operation can be taught to the robot by an offline programming method that does not use an actual robot or an actual machine tool. Typically, in an offline programming method, the models of the robot and its working environment are provided in a computer, and the robot model is manipulated on a display screen to simulate a desired robot operation, so that position/orientation information and motion sequence information, which are to be taught to the actual robot, are obtained. In this connection, the taught information can be validated by the simulation of the robot operation, and therefore, an optimal operation program can be prepared.

However, the position and orientation of a process-related object adapted to be mounted on a machine tool, such as a workpiece, a tool, etc., in a handling operation for the object performed with respect to a mount section, may be changed in accordance with the contents of a workpiece processing program executed by the machine tool. For example, the positions of a workpiece on a table of the machine tool, in an operation wherein the workpiece is loaded on and unloaded from the table, are commanded as workpiece positions at the time of program starting and program ending, respectively, in a processing program for the workpiece. Also, the orientation of the workpiece in the above workpiece handling operation is determined as an orientation (i.e., a direction of coordinate axes) of a workpiece coordinate system inherently provided in the machine tool (typically, a coordinate system having coordinate axes defined by feed axes of the table or tool rest). Thus, the position and orientation of the workpiece in the workpiece handling operation are determined by a workpiece-position command value described in the workpiece processing program and the inherent machine configuration of the machine tool, and therefore tend to change in accordance with a change in the processing program so as to meet the change of the shape or dimension of an unprocessed or processed workpiece. Such a situation may also occur in the handling operation for a tool with respect to a tool rest in the machine tool.

In order to address the circumstances described above, in a conventional manufacturing system including a machine tool and a robot, in the case where the robot operates in accordance with a handling operation program prepared by an offline programming method, every time the workpiece processing program given to the machine tool is changed, an operator has to modify (or re-teach) the handling operation program by manual labor. In the modification of the operation program, the process-related object such as a workpiece, a tool, etc., is placed on a predetermined mount section of the machine tool at position and orientation in an actual handling operation, in accordance with a workpiece processing program after being changed, and thereafter, an operator manipulates the robot in a manual mode with respect to the process-related object, so as to measure an actual relative positional relationship between the robot and the process-related object. Once the actually measured value of a relative position is obtained, position/orientation information in the handling operation program is automatically modified based on the measured value. In this connection, as a procedure for measuring the relative positional relationship between the robot and the process-related object, a technique for measuring the relative position in a plurality of different orientations of the robot by bringing an end-effector region of the robot closer to the process-related object (see, e.g., Japanese Patent No. 2654206 (JP-B-2654206)), or a technique for three-dimensionally measuring the process-related object at a plurality of different positions by a visual sensor temporarily attached to the robot (see, e.g., Japanese Unexamined Patent Publication (Kokai) No. 2005-138223 (JP-A-2005-138223)) is adopted.

As another technique for modifying the operation of a robot in response to the change of a workpiece in a machine tool (i.e., a change in a workpiece processing program), a configuration in which a host computer for controlling the controller of a machine tool and the controller of a robot in an integrated manner is provided in a manufacturing system, and when the workpiece is changed, operation controlling data adapted to a new workpiece is sent from the host computer to the robot controller so as to instruct the robot to perform the handling operation for the new workpiece, as disclosed in Japanese Unexamined Patent Publication (Kokai) No. 5-324034 (JP-A-5-324034). According to this technique, it is no longer necessary to manually modify (or re-teach) the operation program given to the robot.

In a manufacturing system wherein a robot performs a handling operation for a workpiece or a tool with respect to a machine tool, the conventional techniques, in which an operator manually modifies a handling operation program in response to the change in a workpiece processing program, may reduce the rate of operation of the manufacturing system due to a measuring operation for obtaining actual data required for the program modification. Also, in order to stably ensure the operating accuracy of the robot following the modified operation program, operator's skill in the above-described measuring operation is required, and labor costs may thus increase. In particular, in the technique using the three-dimensional measurement by the visual sensor, as described in JP-A-2005-138223, equipment costs may increase due to the provision of the visual sensor and an image processing device.

On the other hand, in the configuration in which the host computer is provided in the manufacturing system, as described in JP-A-5-324034, equipment costs also may increase, and in addition, since the operation of the robot may not be optimized through a simulation in connection with the operation controlling data adapted to the new workpiece, it is difficult to improve efficiency, safety and reliability of the manufacturing system.

SUMMARY OF THE INVENTION

It is an object of the present invention to provide an offline programming device for preparing an operation program for making a robot perform a handling operation for a workpiece or a tool with respect to a machine tool, which makes it possible to easily and accurately modify the operation program in response to the change in a workpiece processing program given to the machine tool without requiring an operator's skill, and keep equipment cost low, and also to improve efficiency, safety and reliability of a manufacturing system.

It is another object of the present invention to provide an offline programming method for preparing an operation program for making a robot perform a handling operation for a workpiece or a tool with respect to a machine tool, which makes it possible to easily and accurately modify the operation program in response to the change in a workpiece processing program given to the machine tool without requiring an operator's skill, and keep equipment cost low, and also to improve efficiency, safety and reliability of a manufacturing system.

It is a further object of the present invention to provide a program, as well as a computer readable recording medium recording the program, for preparing, in an offline mode, an operation program for making a robot perform a handling operation for a workpiece or a tool with respect to a machine tool, which can allow a computer to function so as to easily and accurately modify the operation program in response to the change in a workpiece processing program given to the machine tool without requiring an operator's skill, and keep equipment cost low, and also to improve efficiency, safety and reliability of a manufacturing system.

To accomplish the above object, one aspect of the present invention provides an offline programming device for preparing an operation program for making a robot with a hand attached thereto perform a handling operation for an object with respect to a machine tool, the object including at least one of a workpiece and a tool, the device comprising a hand-position designating section designating a relative positional relationship between the object and the hand when the hand holds the object; a first calculating section determining a position and orientation of the object mounted on the machine tool when the robot performs the handling operation, based on a command specifying a position of the object, the command being included in a workpiece processing program given to the machine tool; a second calculating section determining a position and orientation of the robot acting to hold the object by the hand when the robot performs the handling operation, based on the relative positional relationship between the object and the hand designated by the hand-position designating section and the position and orientation of the object determined by the first calculating section; and an operation-program generating section generating the operation program by using the position and orientation of the robot determined by the second calculating section.

The first calculating section may determine the position and orientation of the object when the object is loaded on or unloaded from the machine tool by the handling operation, based on the command specifying a position of the object at a start or an end of the workpiece processing program, and the second calculating section thus may determine the position and orientation of the robot when the robot loads or unloads the object on or from the machine tool by the handling operation.

The hand-position designating section may designate the relative positional relationship between the object and the hand by using an object model and a hand model, respectively prepared by modeling the object and the hand. In this arrangement, the hand-position designating section may operate to make the hand model simulate a holding motion relative to the object model and to read a relative positional relationship between the object model and the hand model at an appropriately holding state, and thereby designate the relative positional relationship between the object and the hand.

In the case where the machine tool comprises a table capable of moving while supporting a workpiece or a tool rest capable of moving while supporting a tool, the first calculating section may determine a position and orientation of a workpiece mounted on the table or a tool mounted on the tool rest when the robot performs the handling operation, based on the command specifying a position of the table or the tool rest and a feed-axis direction of the table or the tool rest set in the machine tool, and the second calculating section may determine the position and orientation of the robot acting to hold the workpiece mounted on the table or the tool mounted on the tool rest by the hand.

The above offline programming device may further comprise an operation-program correcting section correcting the operation program in response to an error in a relative positional relationship between the machine tool and the robot, when the operation program generated by the operation-program generating section is applied to a manufacturing system including the machine tool and the robot.

If the workpiece processing program is an NC program; the first calculating section may obtain the command from the NC program.

Another aspect of the present invention provides an offline programming method for preparing an operation program for making a robot with a hand attached thereto perform a handling operation for an object with respect to a machine tool, the object including at least one of a workpiece and a tool, the method comprising a hand-position designating step designating a relative positional relationship between the object and the hand when the hand holds the object; a first calculating step determining a position and orientation of the object mounted on the machine tool when the robot performs the handling operation, based on a command specifying a position of the object, the command being included in a workpiece processing program given to the machine tool; a second calculating step determining a position and orientation of the robot acting to hold the object by the hand when the robot performs the handling operation, based on the relative positional relationship between the object and the hand as designated and the position and orientation of the object as determined; and an operation-program generating step generating the operation program by using the position and orientation of the robot as determined.

A further aspect of the present invention provides an offline programming method for preparing an operation program for making a robot with a hand attached thereto perform a handling operation for an object with respect to a machine tool, the object including at least one of a workpiece and a tool, the method comprising an operation-program correcting step correcting the operation program in response to an error in a relative positional relationship between the machine tool and the robot, when the operation program is applied to a manufacturing system including the machine tool and the robot;

wherein correcting the operation program comprises the steps of: providing a machine tool model and a robot model, respectively prepared by modeling the machine tool and the robot; setting a base coordinate-system model on the machine tool model, the base coordinate-system model allowing the workpiece processing program to be executed; providing a position detector in the manufacturing system, the position detector being disposed under a known positional relationship with respect to the robot; providing a target capable of being detected by the position detector at a basic position on the machine tool, the basic position corresponding to a position of an origin of the base coordinate-system model on the machine tool model; detecting the basic position of the target by the position detector; shifting the target along a feed axis of the machine tool, the feed axis corresponding to a coordinate axis of the base coordinate-system model, from the basic position to a predetermined reference position, and detecting the reference position of the target by the position detector; determining a base coordinate system of the machine tool for executing the workpiece processing program, based on the basic position and the reference position of the target detected by the position detector; and correcting the operation program accordingly to a difference between a positional relationship of the base coordinate-system model relative to the robot model and a positional relationship of the base coordinate system relative to the robot.

Yet further aspect of the present invention provides a program for an offline programming, used for preparing, in an offline mode, an operation program for making a robot with a hand attached thereto perform a handling operation for an object with respect to a machine tool, the object including at least one of a workpiece and a tool, the program making a computer function as a hand-position designating section designating a relative positional relationship between the object and the hand when the hand holds the object; a first calculating section determining a position and orientation of the object mounted on the machine tool when the robot performs the handling operation, based on a command specifying a position of the object, the command being included in a workpiece processing program given to the machine tool; a second calculating section determining a position and orientation of the robot acting to hold the object by the hand when the robot performs the handling operation, based on the relative positional relationship between the object and the hand designated by the hand-position designating section and the position and orientation of the object determined by the first calculating section; and an operation-program generating section generating the operation program by using the position and orientation of the robot determined by the second calculating section.

Yet further aspect of the present invention provides a computer readable recording medium recording a program for an offline programming, used for preparing, in an offline mode, an operation program for making a robot with a hand attached thereto perform a handling operation for an object with respect to a machine tool, the object including at least one of a workpiece and a tool, the program making a computer function as a hand-position designating section designating a relative positional relationship between the object and the hand when the hand holds the object; a first calculating section determining a position and orientation of the object mounted on the machine tool when the robot performs the handling operation, based on a command specifying a position of the object, the command being included in a workpiece processing program given to the machine tool; a second calculating section determining a position and orientation of the robot acting to hold the object by the hand when the robot performs the handling operation, based on the relative positional relationship between the object and the hand designated by the hand-position designating section and the position and orientation of the object determined by the first calculating section; and an operation-program generating section generating the operation program by using the position and orientation of the robot determined by the second calculating section.

BRIEF DESCRIPTION OF THE DRAWINGS

The above and other objects, features and advantages of the present invention will become more apparent from the following description of preferred embodiments in connection with the accompanying drawings, wherein:

FIG. 2 is an illustration schematically showing an example of a manufacturing system incorporating the offline programming device of FIG. 1;

FIG. 4 is an illustration for explaining a workpiece processing program that can be used in the offline programming device of FIG. 1;

FIG. 5 is a functional block diagram showing a configuration of an offline programming device according to an embodiment of the present invention;

DETAILED DESCRIPTION

Figure 1:
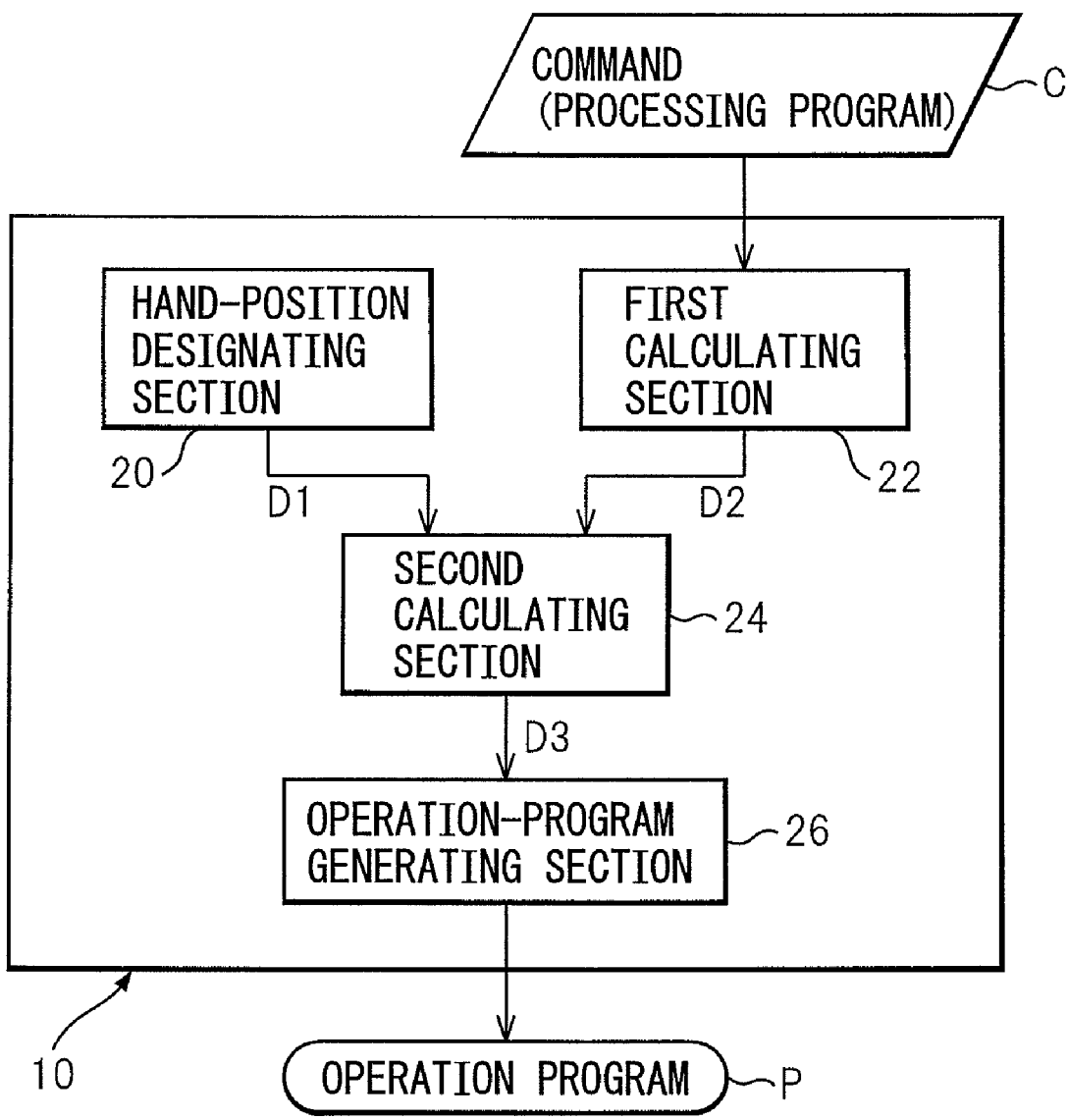
FIG. 1 is a functional block diagram showing a basic configuration of an offline programming device according to the present invention.

The embodiments of the present invention are described below, in detail, with reference to the accompanying drawings. In the drawings, the same or similar components are denoted by common reference numerals.

Referring to the drawings, FIG. 1 shows, by a functional block diagram, a basic configuration of a robot programming device 10 according to the present invention. FIG. 2 schematically shows an exemplary configuration of a manufacturing system 12 incorporating the offline programming device 10 therein. The offline programming device 10 is configured to prepare, in an offline mode, an operation program P for making a robot 18 with a hand 16 attached thereto perform a handling operation (e.g., loading, unloading, repositioning, etc.) for a process-related object, including at least one of a workpiece W and a tool T, with respect to a machine tool 14. The offline programming device 10 may be configured, for example, by installing desired software into a computer such as a personal computer.

The offline programming device 10 includes a hand-position designating section 20 that designates data D1 of a relative positional relationship between the process-related object (W, T) and the hand 16, the relative positional relationship being defined at the time when the hand 16 holds the object (W, T); a first calculating section 22 that determines data D2 of a position and orientation of the object (W, T) mounted on the machine tool 14, the position and orientation of the object (W, T) being provided for the robot 18 at the time when the robot 18 performs the handling operation, based on a command C that specifies a position of the object (W, T) and that is included in a workpiece processing program given to the machine tool 14; a second calculating section 24 that determines data D3 of a position and orientation of the robot 18 acting to hold the object (W, T) by the hand 16, the position and orientation of the robot 18 being provided for the robot 18 at the time when the robot 18 performs the handling operation, based on the relative positional relationship data D1 between the object (W, T) and the hand 16 designated by the hand-position designating section 20 and the position and orientation data D2 of the object (W, T) determined by the first calculating section 22; and an operation-program generating section 26 that generates the operation program P by using the position and orientation data D3 of the robot 18 determined by the second calculating section 24. The hand-position designating section 20, the first calculating section 22, the second calculating section 24 and the operation-program generating section 26 may be configured by a CPU (Central Processing Unit) of a computer such as a personal computer.

As shown in FIG. 2, the manufacturing system 12 includes the machine tool 14 provided with a table 28 and a tool rest 30, respectively acting as mount sections for workpiece W and tool T; the robot (or a robot mechanism section) 18 having, for example, an articulated configuration and provided with the hand 16 as an end effector attached to the distal end of an arm; a machine controller (e.g., an NC unit) 32 for controlling the operation of the machine tool 14; and the offline programming device 10 connected with the robot controller 34 via a communication network 36 such as a LAN. The robot 18 operates under the control of the robot controller 34, in accordance with the operation program P prepared by the offline programming device 10 (FIG. 1), to perform an operation or task for handling a process-related object, such as a workpiece W, a tool T, etc., relative to the machine tool 14; for example, loading the object onto the predetermined mount section such as the table 28 or the tool rest 30, unloading the object from the predetermined mount section, and so on.

In the offline programming device 10 configured as described above, the data D1 of the optimal relative positional relationship between the process-related object such as workpiece W or tool T and the hand 16 at the time when the robot 18 holds the object W, T by the hand 16 is first designated in the hand-position designating section 20, on the basis of the previously known data, such as the configuration of the hand 16, the shape of the object W, T, and so on. The relative positional relationship data D1 is substantially exclusively defined as data relating to an optimal position and orientation correspondingly to the configurations of the hand 16 and object W, T, and thus can be accurately designated, usually without any skill of an operator. In this connection, unless otherwise specified, the term "relative positional relationship" in this application generically means a correlation of both position and orientation.

Data indicating the actual position of the process-related object (workpiece W, tool T, etc.) placed on the mount section (table 28, tool rest 30, etc.) of the machine tool 14 at the time when the robot 18 handles (loads, unloads, repositions, etc.) the object W, T with respect to the mount section is obtained from the command C included in the workpiece processing program given to the machine tool 14. The command C is given to the first calculating section 22 in such a way that, for example, the first calculating section 22 acquires the command C from the machine controller 32 via the communication network 36 (as indicated by a broken line in FIG. 2), or that an operator inputs the command C to the offline programming device 10 as occasion demands.

On the other hand, data indicating the actual orientation of the object W, T placed on the mount section in the above handling operation is given to the first calculating section 22 as, for example, data of an orientation (i.e., a direction of coordinate axes) of a workpiece coordinate system inherently provided in the machine tool 14 (e.g., an orthogonal coordinate system having coordinate axes defined by feed axes of table 28 or tool rest 30), i.e., previously known data provided depending on the structure of the machine tool 14. The orientation data of the workpiece coordinate system is, for example, stored in the offline programming device 10 in advance, or input to the offline programming device 10 by an operator as occasion demands.

Then, the first calculating section 22 converts the command C described in the workpiece processing program and the orientation data of the workpiece coordinate system into data in a basic coordinate system previously set in the robot 18 (e.g., a world coordinate system). As a result, the actual position and orientation data D2 of the object W, T on the mount section, which is needed when the robot 18 performs the handling operation, is determined extremely accurately. Further, the second calculating section 24 applies the relative positional relationship between the object W, T and the hand 16, indicated by the relative positional relationship data D1 designated in the hand-position designating section 20, to the position and orientation data D2 determined in the first calculating section 22. As a result, the actual position and orientation data D3 of the robot 18 acting to hold the object W, T by the hand 16 (i.e., the hand 16 has already held the object W, T (in the case of loading, etc.) or the hand 16 will hold the object W, T from now on (in the case of unloading, etc.)), when the robot 18 performs the handling operation, is determined extremely accurately.

The position and orientation data D2 of the object W, T described above is one which is determined on the basis of the command C described in the workpiece processing program and the orientation data of the workpiece coordinate system. Therefore, even when the workpiece processing program is changed so as to meet the change in shape or dimension of an unprocessed or processed workpiece, the data D2 is automatically modified to an appropriate value by the first calculating section 22 (i.e., without requiring the operator's manual operation) in accurate response to the change in the workpiece processing program. Then, the second calculating section 24 determines, on the basis of the modified position and orientation data D2 of the object W, T, the position and orientation data D3 of the robot 18 (including the hand 16) used for appropriately handling the object W, T described in the workpiece processing program after being changed. The operation-program generating section 26 uses the position and orientation data D3 thus determined, while simulating, as occasion demands, a required robot operation by models of the robot 18 and its working environment (including the machine tool 14) and thereby checking the validity of the taught information (including the position and orientation data D3), and thus generates the optimal operation program P.

As described above, in the offline programming device 10, even when, in the manufacturing system 12 including the machine tool 14 and the robot 18, the workpiece processing program given to the machine tool 14 is changed, it is possible to make the robot 18 perform the desired handling operation with high precision in accordance with the operation program P accurately matching the workpiece processing program after being changed, without performing the modification (i.e., re-teaching) of the operation program by the operator's manual operation. Further, it is not necessary to perform a three-dimensional measurement of the process-related object (workpiece W, tool T, etc.), so that relatively expensive facilities, such as a visual sensor, an image processing device, etc., become unnecessary. Moreover, the optimal operation program P can be generated by performing a simulation of operation, which is usually advantageously performed in an offline programming technique. Therefore, according to the offline programming device 10, it is possible to easily and accurately modify the operation program P in response to the change in a workpiece processing program given to the machine tool 14 without requiring an operator's skill, and to inhibit increase in equipment costs, and also to improve efficiency, safety and reliability of a manufacturing system 12.

Figure 3A:
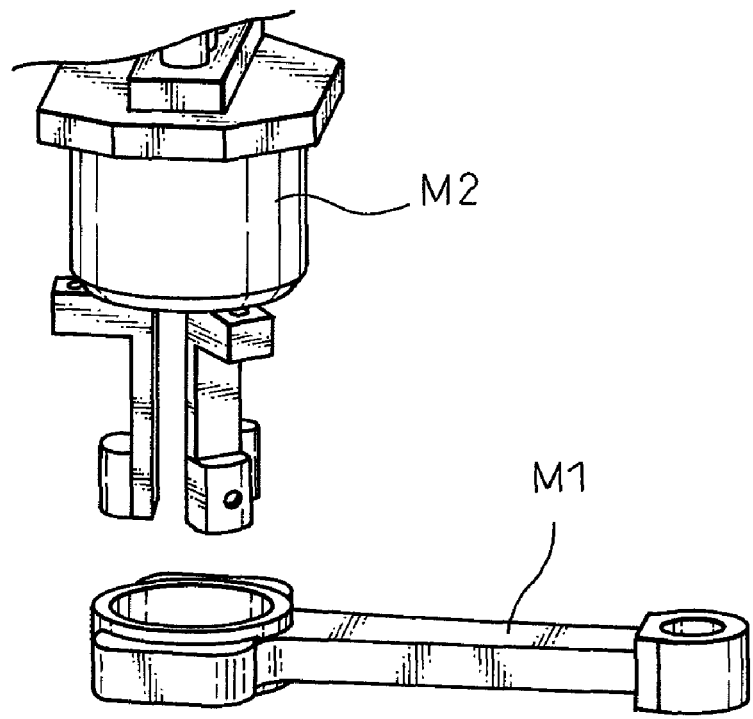
FIG. 3A is an illustration showing one step of an offline programming method performed in the offline programming device of FIG. 1, and showing a state before a hand model holds an object model.

In the offline programming device 10 configured as described above, the hand-position designating section 20 may designate the data D1 of the relative positional relationship between the process-related object (workpiece W, tool T, etc.) and the hand 16 by using an object model and a hand model that are respectively prepared by modeling the object W, T and the hand 16. In this case, as illustrated in FIGS. 3A and 3B, it is advantageous to configure the hand-position designating section 20 such that, based on drawing data prepared by an external apparatus having a designing function such as CAD (Computer-Aided Design), etc., an object model M1 and a hand model M2 are displayed on a screen of a display unit (not shown) additionally provided in the offline programming device 10 (FIG. 3A) and the hand model M2 is manipulated to simulate a holding operation relative to the object model M1 (FIG. 3B), whereby designating the relative positional relationship data D1.

Figure 3B:
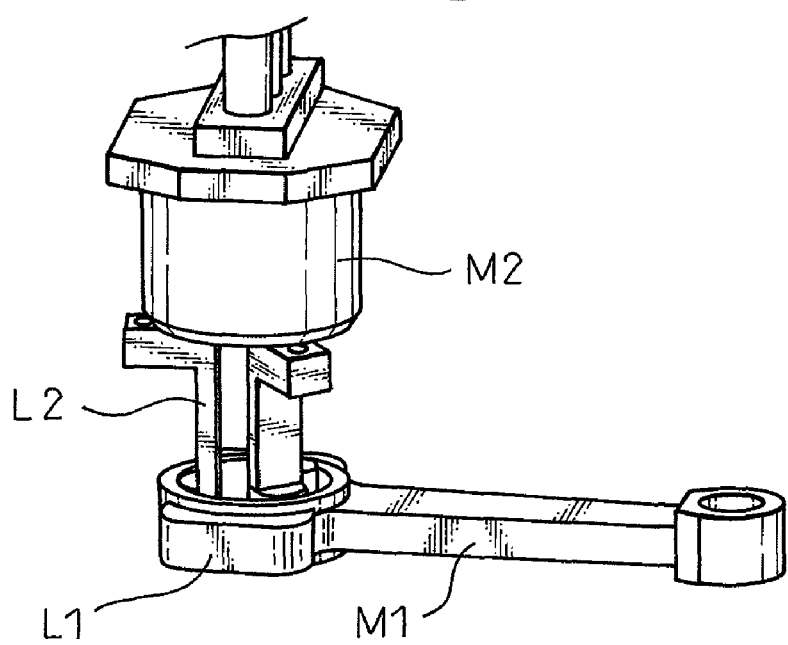
FIG. 3B is an illustration showing one step of an offline programming method performed in the offline programming device of FIG. 1, and showing a state when the hand model properly holds the object model.

In the illustrated example, the hand model M2 properly holds the object (or workpiece) model M1 by inserting three fingers L2 of the hand model M2 into an annular portion L1 of the object (or workpiece) model M1 and thereafter opening the fingers L2 (FIG. 3B). The structurally optimal relative positional relationship between the object (or workpiece) model M1 and the hand model M2 at the properly holding state is read from the drawing data by the hand-position designating section 20, and designated and stored as the relative positional relationship data D1. In this configuration, it is possible to more easily and accurately designate the relative positional relationship data D1 without depending on the operator's skill. Alternatively, in place of using the external device, the offline programming device 10 may be additionally provided with a designing function such as a CAD (Computer-Aided Design), etc., so that the offline programming device 10 operates to prepare, by itself, the drawing data.

In the offline programming device 10, the first calculating section 22 may determine the data D2 of the position and orientation of the process-related object (workpiece W, tool T, etc.) at the time when the object is loaded on the machine tool 14 from the outside thereof by the handling operation, based on the command C that specifies a position of the object W, T at the start of the workpiece processing program. The second calculating section 24 may thus determine, based on the determination in the first calculating section 22, the data D3 of the position and orientation of the robot 18 (including the hand 16) at the time when the robot 18 loads the object W, T held by the hand 16 onto the machine tool 14 by the handling operation.

Also, the first calculating section 22 may determine the data D2 of the position and orientation of the process-related object (workpiece W, tool T, etc.) at the time when the object is unloaded from the machine tool 14 toward the outside thereof by the handling operation, based on the command C that specifies a position of the object W, T at the end of the workpiece processing program. The second calculating section 24 may thus determine, based on the determination in the first calculating section 22, the data D3 of the position and orientation of the robot 18 (including the hand 16) at the time when the robot 18 unloads the object W, T from the machine tool 14 while holding the object with the hand 16 by the handling operation.

If the machine tool 14 is configured to be provided with the table 28 capable of moving while supporting the workpiece W, the first calculating section 22 may determine the data D2 of the position and orientation of the workpiece W mounted on the table 28 at the time when the robot 18 performs the handling operation (loading, unloading, repositioning, etc.), based on the command C that specifies a position of the table 28 and a feed-axis direction of the table 28 set in the machine tool 14 (e.g., rectangular two-axis directions denoted by arrows X1 and Y1 in FIG. 2). The second calculating section 24 may thus determine, based on the determination in the first calculating section 22, the data D3 of the position and orientation of the robot 18 acting to hold the workpiece W mounted on the table 28 by the hand 16.

Also, if the machine tool 14 is configured to be provided with the tool rest 30 capable of moving while supporting the tool T, the first calculating section 22 may determine the data D2 of the position and orientation of the tool T mounted on the tool rest 30 at the time when the robot 18 performs the handling operation (loading, unloading, repositioning, etc.), based on the command C that specifies a position of the tool rest 30 and a feed-axis direction of the tool rest 30 set in the machine tool 14 (e.g., rectangular three-axis directions denoted by arrows X2, Y2 and Z2 in FIG. 2). The second calculating section 24 may thus determine, based on the determination in the first calculating section 22, the data D3 of the position and orientation of the robot 18 acting to hold the tool T mounted on the tool rest 30 by the hand 16.

A concrete example of a procedure for preparing the handling operation program in the offline programming device 10 will be described below with reference to FIG. 4. In the following description, it is assumed that the workpiece processing program given to the machine tool 14 is an NC program, and that the first calculating section 22 obtains the command C from the NC program. In this configuration, even an unskilled operator can readily comprehend the contents of the workpiece processing program, and thus can easily understand a processing detail executed by the offline processing device 10 (in particular, the first calculating section 22). In order to simplify the description, an exemplary case in which the structure of the machine tool 14 and the contents of the workpiece processing program are extremely simplified will be shown below.

First, a following NC program (one block) is assumed by way of example:
G92 X150, Y100;
G90;
X−100.0 Y−100.0;
X100.0 Y−100.0;
X100.0 Y100.0;
X−100.0 Y100.0;
X−100.0 Y−150.0;
M30;

The first line of the above program represents a command for setting a workpiece coordinate system in the machine tool 14, in which a position of an origin O of the workpiece coordinate system is indicated using X-Y coordinate values relative to an arbitrary reference point. The second line represents an absolute-dimension designation, in which it is designated that a numeral of a dimension word indicates a coordinate value. The third to seventh lines represent target position commands for the above-described mount section (table 28 or tool rest 30), in which five target positions a to e are sequentially indicated using X-Y coordinate values relative to the origin O of the workpiece coordinate system. The eighth line represents a program terminating command of this block.

In accordance with the NC program described above, the workpiece W is cut or machined by the tool T into a square profile shown in FIG. 4. In the illustrated example, it is assumed that the machine tool 14 has a construction in which the table 28 (FIG. 2) as the mount section for the workpiece W moves in the rectangular two-axis directions of X and Y axes and, on the other hand, the tool rest 30 (FIG. 2) as the mount section for the tool T does not move. Therefore, although the positions of the tool T in the workpiece coordinate system are indicated by a to e in the above NC program, the table 28 (i.e., the workpiece W) actually moves in such a manner that the tool T is shifted relative to the workpiece W sequentially toward the positions a to e. In this connection, a position command in the NC program may be described in various ways, depending on the construction of the machine tool 14.

In the machine tool 14 configured as described above, in order to prepare the operation program P for unloading a workpiece W, to which a machining process has been completed in accordance with the above NC program, from the table 28 by the handling operation of the robot 18 (FIG. 2), the first calculating section 22 (FIG. 1) determines the position and orientation data D2 of the workpiece W at the time when the workpiece W is unloaded from the table 28, based on the command C (X−100.0 Y−150.0;) at the time when the tool T has reached the position e (i.e., at the end of the workpiece processing program). In this case, the position of the origin O of the workpiece coordinate system (i.e., the geometrical center point of the workpiece W) at the time when the tool T has reached the position e is converted to the position of the workpiece W in the basic or world coordinate system of the robot 18. Further, the feed-axis direction of the table 28 set in the machine tool 14 (i.e., the directions of X and Y axes in the workpiece coordinate system) is treated as the orientation of the workpiece W in the basic coordinate system of the robot 18.

Based on the data D2 of the position and orientation of the workpiece W thus determined and the data D1 of the optimal relative positional relationship (FIG. 3B) between the workpiece W and the hand 16 set by using the above-described CAD, the second calculating section 24 (FIG. 1) determines the data D3 of the position and orientation of the robot 18 (including the hand 16) at the time when the robot 18 unloads the workpiece W from the table 28 with the hand 16 holding the workpiece W. The operation-program generating section 26 defines the position and orientation data D3 thus determined as a taught point in the basic coordinate system of the robot 18, adds predetermined approach and retreat points of the hand 16 with respect to the taught point, and also adds input/output commands required for opening/closing or other operations of the hand 16, so as to generate the operation program P.

In the above concrete example, in order to prepare the operation program P for loading an unprocessed workpiece W onto the table 28 by the handling operation of the robot 18 (FIG. 2), the command C for specifying the position of the workpiece W at the start of the workpiece processing program is needed. In the above NC program, it is assumed that the processing program for a next workpiece W starts in a state at the end of the previous workpiece processing program where the tool T is located at the position e, and therefore, the command C for the position e (X−100.0 Y−150.0;) is used as the command at the start of the program, and the first calculating section 22 (FIG. 1) thus determines the position and orientation data D2 of the workpiece W at the time when the workpiece W is loaded onto the table 28. After that, the operation program P is prepared in a way similar to the above-described procedure.

On the other hand, different from the machine tool 14 described above, in the case where the machine tool 14 has a construction such that the tool rest 30 (FIG. 2) as the mount section for the tool T moves in the rectangular three-axis directions of X, Y and Z axes and, on the other hand, the table 28 (FIG. 2) as the mount section for the workpiece W does not move, the operation program P for making the robot 18 handle the tool T is prepared in a way similar to the above described procedure, as described below. In this case, in the machine tool 14, the tool rest 30 (i.e., the tool T) actually moves in such a manner that the tool T is sequentially shifted toward the positions a to e relative to the workpiece W, in accordance with the commands in the above-described NC program.

In the machine tool 14 configured as described above, in order to prepare the operation program P for unloading a tool T, which has completed the machining process in accordance with the above NC program, from the tool rest 30 by the handling operation of the robot 18 (FIG. 2), the first calculating section 22 (FIG. 1) determines the position and orientation data D2 of the tool T at the time when the tool T is unloaded from the tool rest 30, based on the command C (X−100.0 Y−150.0;) at the time when the tool T has reached the position e (i.e., at the end of the workpiece processing program). In this case, the position e of the tool T is converted to the position of the tool T in the basic or world coordinate system of the robot 18. Further, the feed-axis direction of the tool rest 30 set in the machine tool 14 (i.e., the directions of X, Y and Z axes in the workpiece coordinate system) is treated as the orientation of the tool T in the basic coordinate system of the robot 18.

Based on the data D2 of the position and orientation of the tool T thus determined and the data D1 of the optimal relative positional relationship (not shown) between the tool T and the hand 16 set by using the above-described CAD, the second calculating section 24 (FIG. 1) determines the data D3 of the position and orientation of the robot 18 (including the hand 16) at the time when the robot 18 unloads the tool T from the tool rest 30 with the hand 16 holding the tool T. The operation-program generating section 26 defines the position and orientation data D3 thus determined as a taught point in the basic coordinate system of the robot 18, adds predetermined approach and retreat points of the hand 16 with respect to the taught point, and also adds input/output commands required for opening/closing or other operations of the hand 16, so as to generate the operation program P.

In the above exemplary configuration, in order to prepare the operation program P for loading a new tool T onto the tool rest 30 by the handling operation of the robot 18 (FIG. 2), the command C for specifying the position of the tool T at the start of the workpiece processing program is needed. In the above NC program, it is assumed that the tool T is attached to or detached from the tool rest 30 and the processing program for a next workpiece W starts in a state at the end of the previous workpiece processing program where the tool T is located at the position e, and therefore, the command C for the position e (X–100.0 Y–150.0;) is used as the command at the start of the program, and the first calculating section 22 (FIG. 1) thus determines the position and orientation data D2 of the tool T at the time when the tool T is loaded onto the tool rest 30. After that, the operation program P is prepared in a way similar to the above-described procedure.

In the case where the machine tool 14 has a mechanical construction in which both the table 28 and the tool rest 30 can be suitably moved to process the workpiece W, it will be understood that the offline programming device 10 can prepare the operation program P for making the robot 18 handle the workpiece W and the tool T with respect to the table 28 and the tool rest 30 at any desired period, by suitably combining the above-described exemplary procedures with each other.

As will be understood from the above, the present invention may also be defined as an offline programming method for preparing an operation program P for making a robot 18 with a hand 16 attached thereto perform a handling operation for a process-related object including at least one of a workpiece W and a tool T with respect to a machine tool 14. Thus, the offline programming method according to the present invention includes a hand-position designating step that designates a relative positional relationship between the process-related object (W, T) and the hand 16, the relative positional relationship being defined at the time when the hand 16 holds the object (W, T); a first calculating step that determines a position and orientation of the object (W, T) mounted on the machine tool 14, the position and orientation of the object (W, T) being provided for the robot 18 at the time when the robot 18 performs the handling operation, based on a command C that specifies a position of the object (W, T) and that is included in a workpiece processing program given to the machine tool 14; a second calculating step that determines a position and orientation of the robot 18 acting to hold the object (W, T) by the hand 16, the position and orientation of the robot 18 being provided for the robot 18 at the time when the robot 18 performs the handling operation, based on the relative positional relationship between the object (W, T) and the hand 16 designated in the hand-position designating step and the position and orientation of the object (W, T) determined in the first calculating step; and an operation-program generating step that generates the operation program P by using the position and orientation of the robot 18 determined in the second calculating step.

The offline programming device 10, as well as the offline programming method, configured as described above can make the robot 18 perform an appropriate handling operation by giving the operation program P as it is, generated in the operation-program generating section 26, to the robot 18, provided that a relative positional relationship between the machine tool 14 and the robot 18 in the manufacturing system 12 is constant (i.e., the workpiece coordinate system set in the machine tool 14 has a constant relationship to the basic coordinate system set in the robot 18). However, if an actual relative positional relationship between the machine tool 14 and the robot 18 in the manufacturing system 12 includes an error from a predetermined certain relative positional relationship (hereinafter referred to as a basic relative positional relationship), it is required to suitably correct the operation program P prepared on the basis of the basic relative positional relationship so as to compensate the error in the actual relative positional relationship.

Typically, when a robot operation program prepared by an offline programming method is applied to an actual job site, the operation program is subjected to a preliminary process, generally referred to as a calibration, for correcting an error in a mechanical dimension or in a set coordinate system, existing between a working-environment model of robot, set in a computer, and an actual working environment of robot. For example, as described above, if the actual relative positional relationship between the machine tool 14 and the robot 18 in the manufacturing system 12 includes an error from the basic relative positional relationship, the conventional calibration technique essentially requires measuring the actual relative positional relationship between the machine tool 14 and the robot 18 by, for example, the method described in JP-B-2654206 or JP-A-2005-138223. Such a calibration method results in problems such that the operator's skill in the measuring work is required or equipment costs increase due to relatively expensive equipment.

FIG. 5 shows, by a functional block diagram, a configuration of an offline programming device 40 having an operation program correcting function, according to an embodiment of the present invention, which can solve the above problems involving the calibration. The offline programming device 40 has a basic configuration of the offline programming device 10 shown in FIG. 1, except for the addition of the operation program correction function, so that corresponding components are denoted by like reference numerals and the description thereof is not repeated.

In addition to the basic configuration described above, the offline programming device 40 further includes an operation-program correcting section 42 that corrects the operation program P in response to an error in a relative positional relationship between the machine tool 14 and the robot 18, when the operation program P generated by the operation-program generating section 26 is applied to the manufacturing system 12. The operation-program correcting section 42 can be configured by a CPU (Central Processing Unit) of a computer such as a personal computer. An operation program correcting procedure executed by the operation-program correcting section 42 will be described with reference to FIGS. 6A to 7B.

Figure 6A:
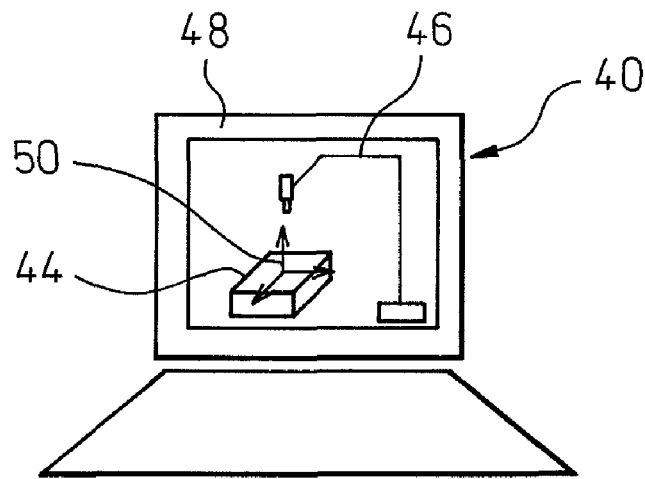
FIG. 6A is an illustration schematically showing an essential step of an offline programming method performed in the offline programming device of FIG. 5, and showing a model setting step in the offline programming device.

First, in the offline programming device 40, a machine tool model 44 and a robot model 46, respectively prepared by modeling the machine tool 14 and the robot 18 in the manufacturing system 12 to which the operation program P is applied, are provided. The machine tool model 44 and the robot model 46 are displayed on the screen of a display unit 48 additionally provided for the offline programming device 40 in a previously set basic coordinate system of the robot model 46, in such a manner as to have a predetermined basic relative positional relationship that approximates the relative positional relationship between the machine tool 14 and the robot 18 in the actual manufacturing system 12 (FIG. 6A).

In the illustrated example, it is assumed that the machine tool 14 is provided with the table 28 capable of moving while supporting the workpiece W, and only a part of a table corresponding to the table 28 is displayed as the machine tool model 44. In connection with the above model configuration, it is assumed that the offline programming device 40 prepares the operation program P for making the robot 18 perform the handling operation (loading, unloading, repositioning, etc.) for the workpiece W with respect to the table 28.

Next, a base or machine coordinate-system model 50 in which the actual workpiece processing program can be executed is set on the machine tool model 44 thus provided. The base coordinate-system model 50 is a coordinate system including an origin and coordinate axes as seen from the robot model 46 (i.e., defined in the basic coordinate system of the robot model 46).

Figure 6B:
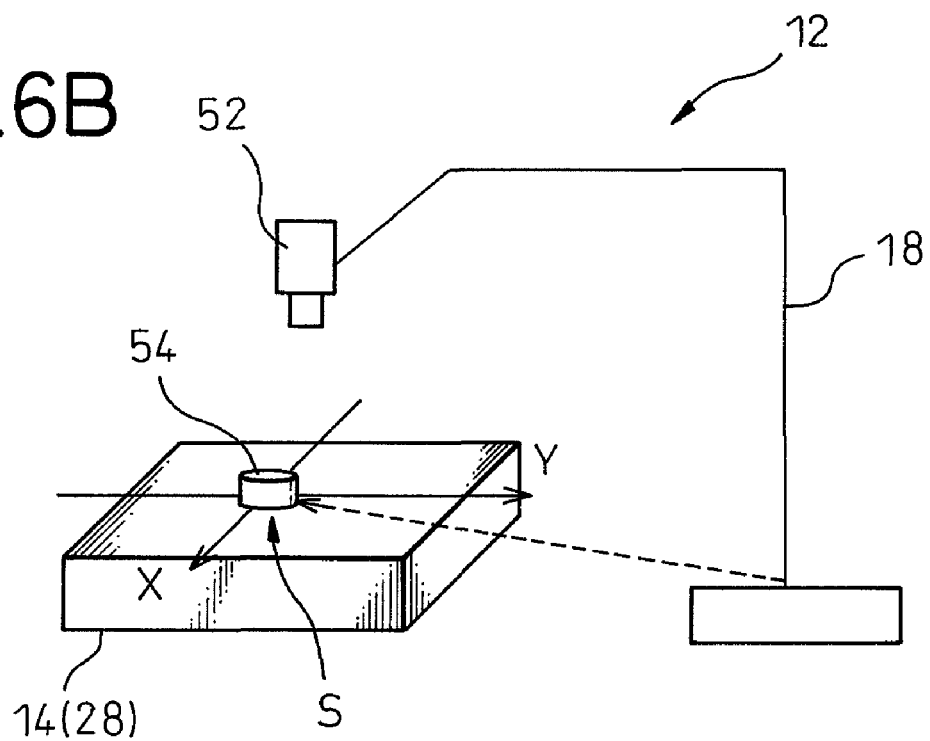
FIG. 6B is an illustration schematically showing an essential step of an offline programming method performed in the offline programming device of FIG. 5, and showing a basic position detecting step in the manufacturing system.

On the other hand, a position detector (e.g., a CCD camera) 52 disposed under a previously known positional relationship with respect to the robot 18 is provided in the manufacturing system 12 (FIG. 6B). In the illustrated example, the position detector 52 is disposed adjacent to the hand 16 (FIG. 2) of the robot 18. Alternatively, on the assumption that the positional relationship between the position detector 52 and the robot 18 is previously known, the position detector 52 may be immovably disposed at a position remote from the robot 18. In either case, the operation-program correcting section 42 of the offline programming device 40 (FIG. 5) acquires detection data from the position detector 52.

Next, a target 54 capable of being detected by the position detector 52 is provided at a basic position S on the actual machine tool 14 (in particular, the table 28), which corresponds to the position of the origin of the base coordinate-system model 50 on the machine tool model 44 (FIG. 6B). The target 54 may be a flat mark or a three-dimensional object. Then, the position detector 52 detects the coordinates of the basic position S (i.e., the position in the basic coordinate system of the robot 18) of the target 54. The basic position S thus detected is sent to the operation-program correcting section 42 of the offline programming device 40.

Figure 7A:
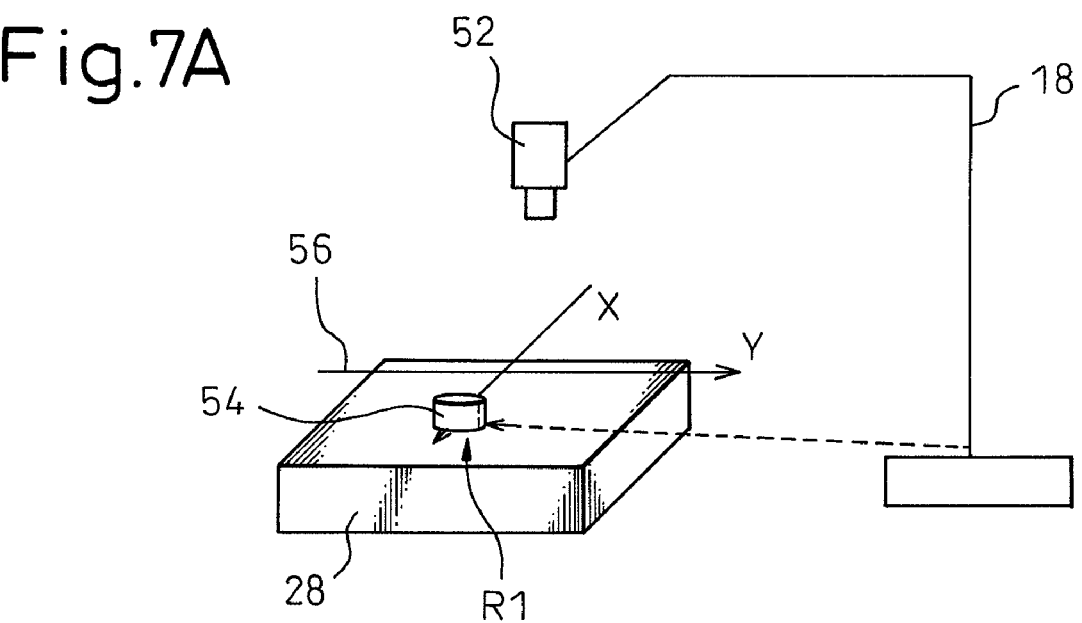
FIG. 7A is an illustration schematically showing an essential step following the step of FIG. 6B, and showing a first reference position detecting step in the manufacturing system.

Next, on the machine tool 14, the target 54 (i.e., the table 28) is shifted along the actual feed axis of the machine tool 14 (X-axis of the table 28, in the drawing), which corresponds to the coordinate axis of the base coordinate-system model 50, from the basic position S to a predetermined first reference position R1 (FIG. 7A). In this state, the position detector 52 detects the coordinates of the reference position R1 (i.e., the position in the basic coordinate system of the robot 18) of the target 54. The reference position R1 thus detected is sent to the operation-program correcting section 42 of the offline programming device 40.

Figure 7B:
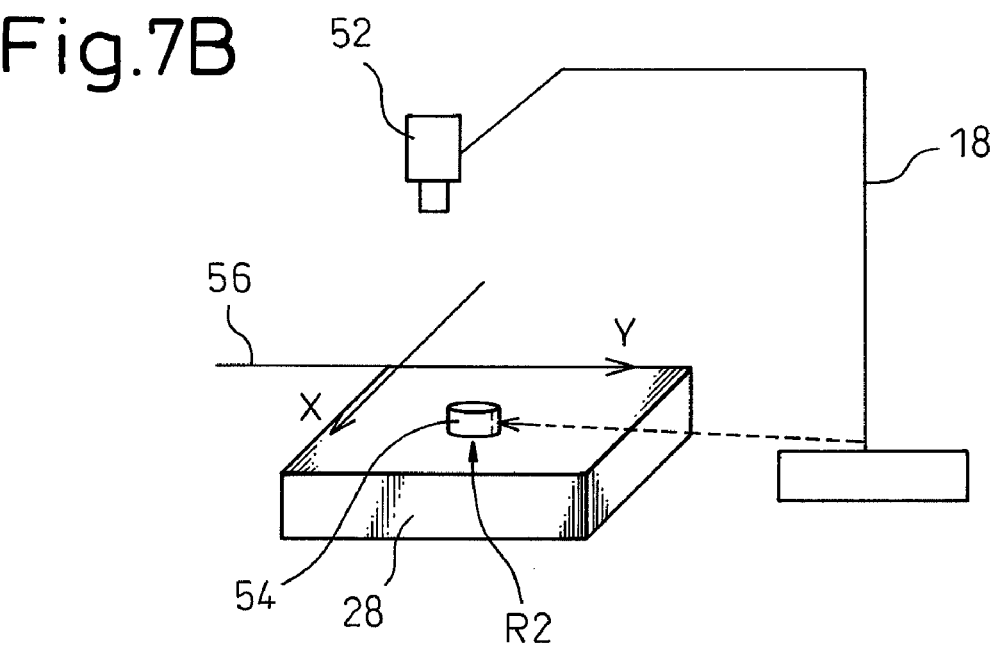
FIG. 7B is an illustration schematically showing an essential step following the step of FIG. 6B, and showing a second reference position detecting step in the manufacturing system.

After that, on the machine tool 14, the target 54 (i.e., the table 28) is shifted along the other actual feed axis of the machine tool 14 (Y-axis of the table, in the drawing), which corresponds to the other coordinate axis of the base coordinate-system model 50, from the first reference position R1 to a predetermined second reference position R2 (FIG. 7B). In this state, the position detector 52 detects the coordinates of the reference position R2 (i.e., the position in the basic coordinate system of the robot 18) of the target 54. The reference position R2 thus detected is sent to the operation-program correcting section 42 of the offline programming device 40.

Next, based on the basic position S and the first and second reference positions R1 and R2 of the target 54 detected by the position detector 52, the operation-program correcting section 42 determines a base or machine coordinate system 56 (i.e., a coordinate system including the origin and the coordinate axes of the basic coordinate system of the robot 18) of the machine tool 14 for executing the workpiece processing program. Thus, in the base coordinate system 56, the basic position S is defined as an origin and axes connecting between the basic position S and the first and second reference position R1, R2 are defined as X and Y-axes, respectively. If the table 28 has only one feed axis (e.g., X-axis), the base coordinate system may be determined by detecting only one reference position (e.g., R1).

After that, the difference $T_S$ between the base coordinate-system model 50 and the actual base coordinate system 56 is determined according to the following formula (i):

$$T_S = T_T^{-1} \cdot T_R \quad \text{(i)}$$

where $T_T$ is a matrix that represents the position and orientation of the base coordinate-system model 50, and $T_R$ is a matrix that represents the position and orientation of the base coordinate system 56.

The difference $T_S$ determined by the formula (i) can be considered as a difference between a positional relationship of the base coordinate-system model 50 relative to the robot model 46 and a positional relationship of the base coordinate system 56 relative to the robot 18. Therefore, the operation-program correcting section 42 corrects the operation program P by using the difference $T_S$ according to the following formula (ii):

$$T_P'(n) = T_P(n) \cdot T_S \quad \text{(ii)}$$

where $T_P(n)$ is a matrix that represents the positions and orientations of the taught points ("n" points) in the operation program P generated by the operation-program generating section 26, and $T_P'(n)$ is a matrix that represents the positions and orientations of the taught points ("n" points) in the operation program P' corrected by the operation-program correcting section 42 (FIG. 5).

In the offline programming device 40 and the offline programming method configured as described above, at the time of a calibration in which the operation program P generated by the operation-program generating section 26 is corrected in correspondence to an error in the actual relative positional relationship between the machine tool 14 and the robot 18 in the job site of the manufacturing system 12, it is possible to measure the actual relative positional relationship between the machine tool 14 and the robot 18 by shifting a movable portion provided in the machine tool 14 (the table 28, in the illustrated embodiment) along the inherent feed axes thereof, without operating the robot 18. The shifting operation of the movable portion of the machine tool 14 along the inherent feed axes toward a target position can be readily performed, without the operator's skill, by simple instructions under highly accurate positioning, and therefore, labor costs can be reduced. Further, the use of the position detector 52 can inhibit the increase of the equipment costs, since expensive three-dimensional measuring equipment is not required.

The offline programming method including the above-described operation program correction step may be utilized not only in the offline programming method including the operation program generating step described with reference to FIG. 1 but also in other various applications. Thus, the present invention provides an offline programming method for preparing an operation program that makes a robot 18 with a hand 16 attached thereto perform a handling operation for an object including at least one of a workpiece W and a tool T with respect to a machine tool 14, wherein the method includes an operation program correcting step for correcting the operation program P in response to an error in a relative positional relationship between the machine tool 14 and the robot 18, when the operation program P is applied to a manufacturing system 12 including the machine tool 14 and the robot 18. The operation program correcting step includes the steps of providing a machine tool model 44 and a robot model 46, respectively prepared by modeling the machine tool 14 and the robot 18; setting a base or machine coordinate-system model 50 on the machine tool model 44, the base coordinate-system model 50 allowing the workpiece processing program to be executed; providing a position detector 52 in the manufacturing system 12, the position detector 52 being disposed under a previously known positional relationship with respect to the robot 18; providing a target 54 capable of being detected by the position detector 52 at a basic position S on the machine tool 14, the basic position S corresponding to a position of an origin of the base coordinate-system model 50 on the machine tool model 44; detecting the basic position S of the target 54 by the position detector 52; shifting the target 54 along a feed axes of the machine tool 14, the feed axis corresponding to a coordinate axes of the base coordinate-system model 50, from the basic position S to a predetermined reference position R1 (R2), and detecting the reference position R1 (R2) of the target 54 by the position detector 52; determining a base coordinate system 56 of the machine tool 14 for executing the workpiece processing program, based on the basic position S and the reference position R1 (R2) of the target 54 detected by the position detector 52; and correcting the operation program P accordingly to a difference between a positional relationship of the base coordinate-system model 50 relative to the robot model 46 and a positional relationship of the base coordinate system 56 relative to the robot 18.

While the basic configuration and the preferred embodiment of the present invention have been explained above, it is also possible to define the present invention in the other categories according to the above description, from a viewpoint that the offline programming device 10, 40 can be configured by a personal computer, as follows.

The present invention provides a program for an offline programming, used for preparing, in an offline mode, an operation program P for making a robot 18 with a hand 16 attached thereto perform a handling operation for a process-related object, including at least one of a workpiece W and a tool T, with respect to the machine tool 14, the program making a computer function as a hand-position designating section 20 designating a relative positional relationship D1 between the process-related object (W, T) and the hand 16 when the hand 16 holds the object (W, T); a first calculating section 22 determining a position and orientation D2 of the object (W, T) mounted on the machine tool 14 when the robot 18 performs the handling operation, based on a command C specifying a position of the object (W, T), the command C being included in a workpiece processing program given to the machine tool 14; a second calculating section 24 determining a position and orientation D3 of the robot 18 acting to hold the object (W, T) by the hand 16 when the robot 18 performs the handling operation, based on the relative positional relationship D1 between the object (W, T) and the hand 16 designated by the hand-position designating section 20 and the position and orientation D2 of the object (W, T) determined by the first calculating section 22; and an operation-program generating section 26 generating the operation program P by using the position and orientation D3 of the robot 18 determined by the second calculating section 24.

Further, the present invention provides a computer readable recording medium recording a program for an offline programming, used for preparing, in an offline mode, an operation program P for making a robot 18 with a hand 16 attached thereto perform a handling operation for a process-related object, including at least one of a workpiece W and a tool T, with respect to the machine tool 14, the program making a computer function as a hand-position designating section 20 designating a relative positional relationship D1 between the process-related object (W, T) and the hand 16 when the hand 16 holds the object (W, T); a first calculating section 22 determining a position and orientation D2 of the object (W, T) mounted on the machine tool 14 when the robot 18 performs the handling operation, based on a command C specifying a position of the object (W, T), the command C being included in a workpiece processing program given to the machine tool 14; a second calculating section 24 determining a position and orientation D3 of the robot 18 acting to hold the object (W, T) by the hand 16 when the robot 18 performs the handling operation, based on the relative positional relationship D1 between the object (W, T) and the hand 16 designated by the hand-position designating section 20 and the position and orientation D2 of the object (W, T) determined by the first calculating section 22; and an operation-program generating section 26 generating the operation program P by using the position and orientation D3 of the robot 18 determined by the second calculating section 24.

As will be understood from the above description, according to the present invention, the operation program is generated by determining the position and orientation of the object on the machine tool when the handling operation is performed, based on the command specifying the position of the object and included in the workpiece processing program given to the machine tool, and also by determining the position and orientation of the robot at the time of performing the handling operation under the predetermined relative positional relationship with respect to the position and orientation of the object, and therefore, even when the workpiece processing program given to the machine tool is changed, the robot is allowed to perform the desired handling operation with high precision in accordance with the operation program accurately matching the workpiece processing program after being changed, without performing the modification (i.e., re-teaching) of the operation program by the operator's manual operation. Further, it is not necessary to perform a three-dimensional measurement of the object (workpiece, tool, etc.), so that relatively expensive facilities, such as a visual sensor, an image processing device, etc., become unnecessary. Moreover, the optimal operation program can be generated by performing a simulation of operation, which is usually advantageously performed in an offline programming technique. Therefore, it is possible to easily and accurately modify the operation program in response to the change in a workpiece processing program given to the machine tool without requiring an operator's skill, and to inhibit increase in equipment costs, and also to improve efficiency, safety and reliability of a manufacturing system.

While the invention has been described with reference to specific preferred embodiments, it will be understood, by those skilled in the art, that various changes and modifications may be made thereto without departing from the scope of the following claims.

The invention claimed is:

1. An offline programming device for preparing an operation program for making a robot with a hand attached thereto perform a handling operation for an object with respect to a machine tool, said object including at least one of a workpiece and a tool, the device comprising a computer having a processor configured to include:
   a hand-position designating section for designating a relative positional relationship between said object and said hand when said hand holds said object;
   a first calculating section for determining a position and orientation of said object mounted on said machine tool when said robot performs said handling operation, based on (i) a command specifying a position of said object and (ii) orientation data of a workpiece coordinate system provided in said machine tool, said command being included in a workpiece processing program given to said machine tool;

a second calculating section for determining a position and orientation of said robot acting to hold said object by said hand when said robot performs said handling operation, based on (a) said relative positional relationship between said object and said hand designated by said hand-position designating section and (b) said position and orientation of said object determined by said first calculating section;

an operation-program generating section for generating said operation program by using said position and orientation of said robot determined by said second calculating section; and an operation-program correcting section for (1) determining an error in a relative positional relationship between said machine tool and said robot, based on detection data of a position detector disposed adjacent to said hand of said robot, and (2) correcting said operation program in response to said error, when said operation program generated by said operation-program generating section is applied to a manufacturing system including said machine tool and said robot.

2. An offline programming device as set forth in claim 1, wherein said first calculating section is configured to determine said position and orientation of said object when said object is loaded on said machine tool by said handling operation, based on (i) said command specifying a start position of said object at a start of said workpiece processing program and (ii) said orientation data, and said second calculating section is configured to determine said position and orientation of said robot when said robot loads said object on said machine tool by said handling operation.

3. An offline programming device as set forth in claim 1, wherein said first calculating section is configured to determine said position and orientation of said object when said object is unloaded from said machine tool by said handling operation, based on (i) said command specifying an end position of said object at an end of said workpiece processing program and (ii) said orientation data, and said second calculating section is configured to determine said position and orientation of said robot when said robot unloads said object from said machine tool by said handling operation.

4. An offline programming device as set forth in claim 1, wherein said hand-position designating section is configured to designate said relative positional relationship between said object and said hand by using an object model and a hand model, respectively prepared by modeling said object and said hand.

5. An offline programming device as set forth in claim 4, wherein said hand-position designating section is configured to make said hand model simulate a holding motion relative to said object model and to read a relative positional relationship between said object model and said hand model at an appropriately holding state, and to whereby designate said relative positional relationship between said object and said hand.

6. An offline programming device as set forth in claim 1, wherein said machine tool comprises a movable table for moveably supporting a workpiece;

said first calculating section is configured to determine a position and orientation of a workpiece mounted on said table when said robot performs said handling operation, based on (i) said command specifying a position of said table and (ii) said orientation data representing a feed-axis direction of said table set in said machine tool, and said second calculating section is configured to determine said position and orientation of said robot acting to hold said workpiece mounted on said table by said hand.

7. An offline programming device as set forth in claim 1, wherein said workpiece processing program is an NC program; and said first calculating section is configured to obtain said command from said NC program.

8. An offline programming method for preparing an operation program for making a robot with a hand attached thereto perform a handling operation for an object with respect to a machine tool, said object including at least one of a workpiece and a tool, the method being executed by a processor of a computer and comprising:

designating a relative positional relationship between said object and said hand when said hand holds said object;

determining a position and orientation of said object mounted on said machine tool when said robot performs said handling operation, based on (i) a command specifying a position of said object and (ii) orientation data of a workpiece coordinate system provided in said machine tool, said command being included in a workpiece processing program given to said machine tool;

determining a position and orientation of said robot acting to hold said object by said hand when said robot performs said handling operation, based on (a) said relative positional relationship between said object and said hand as designated and (b) said position and orientation of said object as determined;

generating said operation program by using said position and orientation of said robot as determined; and determining an error in a relative positional relationship between said machine tool and said robot, based on detection data of a position detector disposed adjacent to said hand of said robot, and correcting said operation program in response to said error, when said operation program generated by said operation-program generating section is applied to a manufacturing system including said machine tool and said robot.

9. An offline programming method as set forth in claim 8, wherein correcting said operation program comprises:

obtaining a machine tool model and a robot model, respectively prepared by modeling said machine tool and said robot;

setting a base coordinate-system model on said machine tool model, said base coordinate-system model allowing said workpiece processing program to be executed;

obtaining a known positional relationship in said manufacturing system between said position detector and said robot;

causing said position detector to detect a basic position on said machine tool by detecting a target provided at said basic position, said basic position corresponding to a position of an origin of said base coordinate-system model on said machine tool model;

causing a shift of said target along a feed axis of said machine tool, said feed axis corresponding to a coordinate axis of said base coordinate-system model, from said basic position to a predetermined reference position, and causing said position detector to detect said reference position of said target;

determining a base coordinate system of said machine tool for executing said workpiece processing program, based on said basic position and said reference position of said target detected by said position detector; and correcting said operation program according to a difference between a positional relationship of said base coordinate-system model relative to said robot model and a positional relationship of said base coordinate system relative to said robot.

10. An offline programming method as set forth in claim 8, wherein said workpiece processing program is an NC program; and determining the position and orientation of said object includes obtaining said command from said NC program.

11. An offline programming method for preparing an operation program for making a robot with a hand attached thereto perform a handling operation for an object with respect to a machine tool, said object including at least one of a workpiece and a tool, the method being executed by a processor of a computer and comprising:

correcting said operation program in response to an error in a relative positional relationship between said machine tool and said robot, when said operation program is applied to a manufacturing system including said machine tool and said robot;

wherein correcting said operation program comprises:

providing a machine tool model and a robot model, respectively prepared by modeling said machine tool and said robot;

setting a base coordinate-system model on said machine tool model, said base coordinate-system model allowing a workpiece processing program given to said machine tool to be executed;

obtaining a known positional relationship in said manufacturing system between a position detector and said robot;

causing said position detector to detect a basic position on said machine tool by detecting a target provided at said basic position, said basic position corresponding to a position of an origin of said base coordinate-system model on said machine tool model;

causing a shift of said target along a feed axis of said machine tool, said feed axis corresponding to a coordinate axis of said base coordinate-system model, from said basic position to a predetermined reference position, and causing said position detector to detect said reference position of said target;

determining a base coordinate system of said machine tool for executing said workpiece processing program, based on said basic position and said reference position of said target detected by said position detector; and correcting said operation program according to a difference between a positional relationship of said base coordinate-system model relative to said robot model and a positional relationship of said base coordinate system relative to said robot.

12. A non-transitory computer readable recording medium recording computer-executable instructions for preparing, in an offline mode, an operation program for making a robot with a hand attached thereto perform a handling operation for an object with respect to a machine tool, said object including at least one of a workpiece and a tool, said instructions, when executed by a computer, making the computer function as:

a hand-position designating section for designating a relative positional relationship between said object and said hand when said hand holds said object;

a first calculating section for determining a position and orientation of said object mounted on said machine tool when said robot performs said handling operation, based on (i) a command specifying a position of said object and (ii) orientation data of a workpiece coordinate system provided in said machine tool, said command being included in a workpiece processing program given to said machine tool;

a second calculating section for determining a position and orientation of said robot acting to hold said object by said hand when said robot performs said handling operation, based on (a) said relative positional relationship between said object and said hand designated by said hand-position designating section and (b) said position and orientation of said object determined by said first calculating section;

an operation-program generating section for generating said operation program by using said position and orientation of said robot determined by said second calculating section; and an operation-program correcting section for (1) determining an error in a relative positional relationship between said machine tool and said robot, based on detection data of a position detector disposed adjacent to said hand of said robot, and (2) correcting said operation program in response to said error, when said operation program generated by said operation-program generating section is applied to a manufacturing system including said machine tool and said robot.

\* \* \* \* \*

UNITED STATES PATENT AND TRADEMARK OFFICE
CERTIFICATE OF CORRECTION

| | | |
|---|---|---|
| PATENT NO. | : 8,155,789 B2 | Page 1 of 1 |
| APPLICATION NO. | : 11/960995 | |
| DATED | : April 10, 2012 | |
| INVENTOR(S) | : Yoshiharu Nagatsuka et al. | |

It is certified that error appears in the above-identified patent and that said Letters Patent is hereby corrected as shown below:

On the cover page, please correct the Assignee Name as follows:

(73) Assignee: FANUC LTD, Yamanashi (JP)

Signed and Sealed this
Third Day of July, 2012

David J. Kappos
*Director of the United States Patent and Trademark Office*